Patented Dec. 13, 1938

2,140,271

UNITED STATES PATENT OFFICE 2,140,271

PROCESS FOR THE PRODUCTION OF SYNTHETIC DRYING OILS

Alexander Schwarcman, Buffalo, N. Y., assignor to Spencer Kellogg and Sons, Inc., Buffalo, N. Y., a corporation of New York No Drawing. Application October 25, 1937, Serial No. 170,957

15 Claims. (Cl. 260—407)

This invention or discovery relates to artificial drying oils and methods of producing same; and it comprises a method of converting castor oil into a drying oil wherein castor oil is heated with a suitably prepared catalyst at a temperature of about 350° to 500° F. until a substantial increase in iodin number occurs, the catalyst is removed, as by filtration, leaving a clear oil miscible with hydrocarbons but having incompletely developed drying properties, and this intermediate oil is heated to a temperature of about 600° F. to stabilize it, to develop drying power and to body the oil; and it comprises suitable catalysts for use in the process and a method of preparing them; and it comprises as new materials the intermediate oil and the bodied drying oil produced; all as more fully hereinafter set forth and as claimed.

It is known that castor oil is largely composed of ricinolein, which is the triglyceride of ricinoleic acid. This acid has the empirical formula $C_{18}H_{34}O_3$; it has a double bond between $C_9$ and $C_{10}$ and is further characterized by an alcoholic hydroxyl group on $C_7$. Because of the alcoholic character imparted by this hydroxyl group, castor oil is soluble in alcohol and other oxygen-containing solvents and it is compatible with varnish and lacquer compositions having alcohol or ketones as solvents. Castor oil is not miscible, however, with hydrocarbon solvents, including petroleum oils and lubricating oils.

Sometimes it is considered desirable to blend castor oil with ordinary lubricating oil. For making these composite lubricants, castor oil can be given miscibility by mild pyrolysis or by esterifying the alcohol groups. Generally, however, it is simply heated with a catalyst. Any of the many catalysts used in making ether or ethylene from alcohol (acids, acid salts, activated fuller's earth, alumina, etc.,) can be used, though there are but few giving a smooth and controllable action without discoloration or far-going changes in the oil. The search for a really good catalyst is still active.

One difficulty in the operation is avoiding the development of new double bonds; a new ethylene linkage in the ricinoleic groups. This causes ready oxidizability and drying power; both highly undesirable.

Attempts to utilize this double bond reaction to convert castor oil into a synthetic drying oil have not been commercially successful; partly because of catalyst difficulties and partly because of non-recognition of necessary conditions. In one method, for example, castor oil was heated with a specially prepared highly active fuller's earth, and the product was a pasty mass from which it was impracticable to separate the earth in any simple way and in which the liquid phase was not a good drying oil.

In this operation, and others, the attempt has been to go directly from castor oil to a commercial drying oil. This is not impracticable, but it is very difficult as a commercial proposition because of the exact control of conditions required. In a prior and copending application, Serial No. 130,221, wherewith the present application has certain matter in common, I have described such a method; castor oil carrying about 1 per cent suspended sodium bisulfate being carefully heated under a good vacuum until the iodin number ceases to increase rapidly. At this time the oil produced is thin enough to permit ready removal of the catalyst and is a drying oil. It is, however, too thin bodied for most uses and in practice it is polymerized by heat to give it the body usually wanted in the trade.

In the present invention I operate somewhat differently. I catalyze the oil almost, but not quite completely, with a suspended catalyst, remove the catalyst and develop drying powers by a further heat treatment. This heat treatment is ordinarily also utilized to give a commercial body to the oil. A remarkable result of this operation is that at the time the catalyst is removed the oil is actually thinner and less viscous than the original oil. This materially facilitates removal of the catalyst. I have found that removal of the catalyst at this stage is important from the standpoint of process control, as all catalysts have other actions than simple dehydroxylation—in particular, a polymerizing or thickening action—which tend to become predominant upon prolonged heating.

In detail, in the present invention I subject castor oil to a two-stage operation or two-stage heating, first in the presence of a catalyst and secondly in its absence. The oil is heated with a solid catalyst kept in suspension by agitation until the development of foggy bubbles of steam slackens or ceases and until the iodin number has increased about 50 per cent; say from 85 to 120 or 130 or higher. This produces an intermediate oil which has substantially no utilizable drying properties; it will not dry to a hard, non-tacky varnish film. Nor is it particularly stable. Ordinarily the operation is so conducted that not all the castor oil is converted, there being usually about 5 or 10 per cent residual ricinolein, or a corresponding amount or mixed glycerides carrying ricinoleic acid. This is usually advantageous in that it provides a factor of safety against far-going reactions, and moreover gives a desirable elasticity to dried varnish films produced from the finished oil. If desired, I may so conduct the catalytic heat treatment that conversion is complete, however.

This intermediate oil is, as stated, of a consistency permitting easy removal of the catalyst by filtration, settling or centrifugal action. The catalyst is removed to give a clear oil, and this clear oil is then heated for a time to stabilize it and develop the drying power. It is advantageous to perform this second heating under substantially the conditions commercially used in making stand oil from linseed oil; that is, keeping the oil at a temperature of 550° to 600° F. for 2 to 6 hours, until it acquires the desired body. In the first heating with the catalyst, the temperature used is much lower, being on the order of 350° to 450° F.

In the two-stage operation described, as an academic matter, a wide variety of materials may be used to catalyze the removal of hydroxyl and the production of ethylenic union in the first stage. Practically, however, the choice is limited by the necessity of avoiding side reactions, darkening, undue thickening, etc. The best material I have found is a composite catalyst; a body of finely divided porous inert mineral or earthy matter (fuller's earth, kieselguhr, alumina, etc.) containing a very little free acid; enough to give a definite but faint acidity. An acid treated fuller's earth washed to neutrality will catalyze the desired actions without side reactions but it is too slow. On the other hand, free acids and acid-reacting compounds, and particularly sulfuric acid and sodium bisulfate, when used alone in sufficient quantity, catalyze the dehydroxylation energetically; too energetically in fact. It is difficult to avoid, among other undesirable phenomena, darkening of the oil and development of a high acid number. With my new catalyst, an earthy material carrying a mere trace of free acid, a good clean catalysis can be effected without side reactions and without darkening the oil or increasing its acid number. While sulfuric acid alone inevitably produces darkening in whatever way it may be added to the oil, sulfuric acid used in minute amount with the earthy material in my catalyst has no such effect. In a way of speaking, the earthy material acts as a bulking agent and allows even distribution of an extremely minute amount of acid—an amount too small to effect the desired dehydroxylation by itself. The earthy material and the incorporated acid together give an effect which is not given or approximated by either singly.

For the carrier, I have found it particularly advantageous to employ the inexpensive commercial grades of fuller's earth or kieselguhr. These by themselves exert no dehydroxylating effect on castor oil, even when heated with the oil at higher temperatures than are employed in my new process and for periods many hours longer.

With the selected earthy carrier I ordinarily employ sulfuric acid because of its availability and low cost; but other acids, both mineral and organic, including acetic acid, may be used in place of the sulfuric acid. Sodium bisulfate may also be used, as in my prior invention, but in much smaller quantities than are there described—say about 10 per cent as great. It is no better than sulfuric acid, however, and is less convenient to use in impregnating the earth with minute but exact amounts. When using sulfuric acid, I find it desirable to employ the acid in an amount corresponding to about .05 of one per cent of the oil treated, with a much larger amount of carrier; enough to give about 2 per cent by weight on the oil treated. For example, in the catalysis of 2000 pounds of castor oil I find it advantageous to employ about 40 pounds of clean kieselguhr or other inert porous earth carrying about one pound of concentrated sulfuric acid. The actalyst may be prepared by suspending the carrier in water, adding the acid, mixing thoroughly, filtering, drying and powdering, or it may be prepared by adding the acid directly to the dry pulverulent carrier.

The amounts of acid and total catalyst specified in the preceding paragraph may be varied if desired. A larger proportion of acid accelerates the reaction to some extent, but also darkens the product and is therefore undesirable. I have not found that it was advantageous to use any larger percentages of earthy carrier with the stated quantity of sulfuric acid, and I belive that about .05 per cent of acid calculated on the oil and about 2 per cent of total catalyst are the most effective and most economical proportions to employ. It is to be understood, however, that my invention is not limited to the use of these particular quantities.

When using acetic acid in the place of sulfuric acid, I find it advantageous to employ a somewhat larger amount, as the action of acetic acid on the oil is less violent than the action of sulfuric acid, and the reaction may therefore be accelerated without producing excessive darkening. I find that it is safe, and in fact advantageous, to employ amounts of acetic acid totaling up to about 0.15 per cent calculated on the oil, and when using this amount of acid I find it advantageous to employ about 3 per cent, on the oil, of total catalyst.

In another modification of my invention, the carrier is washed substantially free of acid before it is heated with the oil. For example, American fuller's earth having no catalytic effect on the oil by itself may be suspended in three times its weight of water, and a few per cent of hydrochloric or sulfuric acid may then be stirred in. The earth is then filtered from the acid liquid and washed repeatedly until the wash water is neutral. The earth is then dried and powdered and can be used as a slow catalyst. But it is better to acidify it.

When employing my catalyst containing about .05 per cent of acid calculated on the oil, a mixture of oil and catalyst (about 2 per cent) is brought up to a temperature of approximately 400° F. At a temperature of about 380° F. white foggy bubbles begin to appear. Formation and extrication of water by the hydroxylating action becomes quite violent at a temperature between 420° and 460° F.—usually about 440° F.—and energetic action is substantially completed at this temperature in about half an hour. I find it desirable to continue the heating at this temperature for a total of about 1.5 hours, however. When employing the acetic acid catalyst the best temperature is somewhat higher, about 480° F. for example. In either case, I find that it makes very little difference whether the catalyst is added to the cold oil or the oil is heated to the desired temperature before the catalyst is added.

In this catalyzing operation the iodin value of the oil increases about 50 per cent in about 1.5 hours or less. Most of the increase from 85 to 125 or 140, for example, takes place within the first half hour after the reaction temperature is reached.

The above description applies principally to operations at atmospheric pressure. It is sometimes desirable to operate under vacuum, although this is seldom necessary with my new catalyst. Operating under vacuum has the advantage, however, that it yields a product of somewhat lower acid value, and the acid value can be controlled within substantially any desirable range by bleeding a small amount of inert gas, such as $CO_2$ or nitrogen, into the oil during the heating under vacuum. I generally find it advantageous not to apply vacuum until substantially the desired iodin value is attained by heating with the catlyst at atmospheric pressure for about half an hour, for example. The remainder of the first heating stage can then be conducted under suitable vacuum, with or without bleeding in a small amount of inert gas, to reduce the acid value of the intermediate oil.

To produce the best results, it is essential that the intermediate product above described be polymerized or subjected to further heat treatment in the complete absence of catalyst. The catalyst is therefore removed from the intermediate oil by filtration or centrifuging, and one of the advantages of my catalyst is that it can be readily removed. The oil, after removal of the catalyst, is miscible with mineral oils and hydrocarbon solvents and has a high iodin number. At this stage, however, the oil will not "dry" in the sense of making a satisfactory varnish film, either with or without the addition of driers. Its drying power, so to speak, is only potential.

After removal of the catalyst this clear intermediate oil of low viscosity is subjected to a temperature on the order of 550° to 600° F. at atmospheric pressure or under vacuum, the most desirable temperature being about 590° F. This temperature is maintained for a sufficient period, such as about two to six hours, to convert the intermediate oil into a final product which is a true drying oil and is polymerized to some extent, and may also be considered a stand oil if the heating is sufficiently prolonged. This oil has exceptionally good drying power, and with the addition of .01 per cent of catalytic drier such as cobalt linoleate, it will dry to form a smooth, glossy, elastic waterproof film in about one to three hours.

The properties of this final oil are unique. Like linseed stand oil it yields rubbery linoxyn-like substances on air blowing, but like China-wood oil it seems to set in a varnish film largely by internal actions, and it gives a waterproof film, which linseed oil will not. Unlike China-wood oil and like linseed oil, it does not gel or coagulate on heating. The new oil is applicable to most of the purposes for which China-wood oil may be employed, and is also applicable to most of the purposes for which polymerized linseed oil is used, including the manufacture of linoleum.

As a specific example of the operation of my invention, I will now describe the full cycle of operations involved in a particular two-stage conversion of castor oil to drying oil on a commercial scale. The castor oil used as a starting material was nearly water white in color, had a specific gravity of 0.9620, an acid value between 1 and 2, a saponification value of 182.0, an iodin value of 86.0, and a viscosity of U on the Gardner-Holdt scale, corresponding to 6.27 poises, at 25° C. This oil was, of course, soluble in alcohol and insoluble in mineral oils.

Catalyst was prepared by uniformly incorporating one pound of concentrated sulfuric acid with 40 pounds of an ordinary commercial American type of fuller's earth, which in itself has no dehydroxylating effect on castor oil at any known temperature, as described hereinabove. This catalyst was mixed with 2,000 pounds of the above castor oil, and heated in an open kettle with stirring. At a temperature below 400° F., dehydroxylation started, as was evidenced by the evolution of steam bubbles. At a temperature a little above 400° F., this reaction became quite violent and continued for nearly half an hour. The evolution of steam then continued at a much slower rate, and heating at a temperature of about 440° F. was continued, with mechanical agitation, for about an hour more. The catalyst was then separated from the intermediate oil by filtration, and a sample of the oil was taken for testing. This oil had a very pale straw color, was insoluble in alcohol, and was soluble in mineral oils. Its specific gravity was 0.9468 and it had a viscosity of Q on the Gardner-Holdt scale, corresponding to 4.35 poises. Its acid value was 5, saponification value 186, and iodin value 130. In similar runs with other batches of oil, acid values were obtained between 4 and 6, with saponification values of from 185 to 190, and iodin values from 125 to 140. The intermediate oil thus produced can be made to dry or form a film when enough catalytic drier such as cobalt is added, but the film remains soft and is not waterproof and is not a satisfactory commercial varnish film.

The intermediate oil just described was then given a further heat treatment in an open kettle at a temperature of about 590° F. for about 5 hours. The oil thus produced was still soluble in mineral oils and insoluble in alcohol and had a light amber color—a pale clear yellow. Its specific gravity had increased to 0.9600 and its viscosity to Z-2+ on the Gardner-Holdt scale, corresponding to about 38 poises. Its acid value was 9, its saponification value 192 and its iodin value 112. In other similar runs the acid value of the final product varied between 8 and 12, and the iodin value varied between 108 and 115. It is interesting to note that although the final oil had a viscosity considerably higher than that of the original castor oil, its specific gravity was lower. It is to be understood that the viscosity and other properties of the final oil can be varied by varying the length of the second heat treatment. The final oil is a true drying oil which, with the addition of a trace of drier, dries in less than two hours to form a lustrous, elastic film which is truly waterproof and highly satisfactory.

One of the features of my invention is that it produces a drying oil of very light color. It is obvious, however, that the color of the final product or polymerized oil depends to some extent on the color of the starting material, the care taken during the heat treatments, and the kind of metal or other material from which the heating kettle is made.

As pointed out hereinabove, the final oil resembles tung oil or China-wood oil in a great many respects. Because of this resemblance, it is sometimes desirable to blend the oil with China-wood oil. This may be done after the finished oil is produced as described hereinabove. As an alternative, I may mix China-wood oil and castor oil, in equal or other desired proportions, and put the mixed oil through the treatment above described. This produces a new drying oil which has many advantages. Other oils containing substantial proportions of ricinolein may be treated similarly to castor oil, with similar results.

What I claim is:

1. In the production of a drying oil from castor oil, the process which comprises heating castor oil with a suspended solid catalyst at a temperature of about 350° to 500° F. until there is a large increase in the iodin number, said catalyst being selected from the group consisting of sodium bisulfate and mixtures of earthy materials which have substantially no polymerizing or dehydroxylating effect on castor oil with minor amounts of acid material insufficient to dehydroxylate the oil, removing the catalyst, and continuing the heating at a temperature of about 550° to 600° F. to produce stabilization and develop drying properties.

2. The process of claim 1 wherein the suspended catalyst comprises said earthy material and a trace of free sulfuric acid.

3. The process of claim 1 wherein the suspended catalyst comprises said earthy material and a trace of free acetic acid.

4. The process of claim 1 wherein the suspended catalyst comprises said earthy material and about .05 per cent sulfuric acid calculated on the oil.

5. In the process of claim 1, performing the first heating at a temperature of the order of 450° F. maintained for about 1.5 hours.

6. In the process of claim 1, heating the castor oil with the catalyst at atmospheric pressure until the desired iodin value is attained and continuing heating under vacuum to reduce the acid value.

7. In a process of producing drying oil from castor oil, preparing a catalyst by contacting finely divided earthly material which in itself has substantially no polymerizing or dehydroxylating effect on castor oil with a smaller quantity of acid material not exceeding about 10 per cent of the weight of the earthy material, adding to the castor oil to be treated a quantity of said catalyst not exceeding about 5 per cent of the weight of oil and containing said acid material in an amount insufficient by itself to dehydroxylate the oil and not exceeding about 0.5 per cent of the weight of oil, heating the castor oil and catalyst together at a temperature between 350° and 500° F. until evolution of water-vapor substantially ceases, removing the catalyst from the intermediate oil so produced, and heating the intermediate oil at a temperature of the order of 550° to 600° F. for a period sufficient to produce a polymerized drying oil.

8. The process of claim 7 wherein the quantity of catalyst employed is about 2 per cent of the weight of the oil and the acid material is sulfuric acid amounting to about 0.05 per cent of the weight of the oil.

9. The process of claim 7 wherein the quantity of catalyst employed is about 3 per cent of the weight of the oil and the acid material is acetic acid amounting to about 0.15 per cent of the weight of the oil.

10. The method of preparing a catalyst for the conversion of castor oil into an artificial drying oil, which comprises contacting a finely divided earthy material which in itself has substantially no polymerizing or dehydroxylating effect on castor oil with a quantity of acid material insufficient to effect the desired dehydroxylation of the oil at temperatures of 350° to 500° F.

11. The method of claim 10, wherein the earthy material is mixed with a quantity of acid amounting to less than 0.3 per cent of the weight of the castor oil to be treated.

12. As a catalyst for the conversion of castor oil to an intermediate oil having potential drying properties by heating at temperatures of about 350° to 500° F., a finely divided, porous, earthy material which has substantially no polymerizing or dehydroxylating effect on castor oil and having dispersed thereon an amount of acid material which is insufficient in itself to effect the desired conversion.

13. The catalyst of claim 12 wherein the acid material is sulfuric acid.

14. The catalyst of claim 12 wherein the acid material is sodium bisulfate.

15. The catalyst of claim 12 wherein the acid material is acetic acid.

ALEXANDER SCHWARCMAN.